US008755526B2

(12) United States Patent
Robert et al.

(10) Patent No.: US 8,755,526 B2
(45) Date of Patent: Jun. 17, 2014

(54) UNIVERSAL FILE PACKAGER FOR USE WITH AN INTEROPERABLE KEYCHEST

(75) Inventors: Arnaud Robert, Burbank, CA (US); Scott F. Watson, Marina Del Rey, CA (US)

(73) Assignee: Disney Enterprises, Inc., Burbank, CA (US)

( * ) Notice: Subject to any disclaimer, the term of this patent is extended or adjusted under 35 U.S.C. 154(b) by 893 days.

(21) Appl. No.: 12/460,009

(22) Filed: Jul. 10, 2009

(65) Prior Publication Data

US 2011/0007903 A1 Jan. 13, 2011

(51) Int. Cl.
*G06F 21/00* (2013.01)

(52) U.S. Cl.
USPC ........... 380/279; 380/239; 380/277; 380/278; 380/281

(58) Field of Classification Search
USPC .................................. 380/279, 281, 284, 45
See application file for complete search history.

(56) References Cited

U.S. PATENT DOCUMENTS

| 6,460,163 | B1 | 10/2002 | Bowman |
| 7,039,615 | B1 | 5/2006 | Gajjala |
| 7,627,892 | B2 | 12/2009 | Lin |
| 2002/0194492 | A1 | 12/2002 | Choi |
| 2003/0079133 | A1 | 4/2003 | Breiter |
| 2004/0168184 | A1 | 8/2004 | Steenkamp |
| 2006/0021063 | A1 | 1/2006 | Hori |
| 2006/0143690 | A1 | 6/2006 | Lin |
| 2006/0227975 | A1* | 10/2006 | Ueda et al. .................. 380/281 |
| 2006/0229992 | A1 | 10/2006 | Morten |
| 2007/0156601 | A1 | 7/2007 | Brew |
| 2008/0046929 | A1* | 2/2008 | Cho et al. .................. 725/46 |
| 2008/0082633 | A1 | 4/2008 | Koyama |
| 2008/0162354 | A1 | 7/2008 | Alve |

(Continued)

FOREIGN PATENT DOCUMENTS

| CN | 1848128 | | 10/2006 |
| EP | 1371170 | A1 * | 12/2003 |
| WO | WO 2007/028099 | | 3/2007 |
| WO | WO 2008/013562 | | 1/2008 |

OTHER PUBLICATIONS

"An Improved Construction for Universal Re-encryption"; Peter Fairbrother; http://www.zenadsl6186.zen.co.uk/ICUR.pdf; Jan. 15, 2003; 9 pages.*

(Continued)

*Primary Examiner* — Jason Lee
(74) *Attorney, Agent, or Firm* — Farjami & Farjami LLP

(57) ABSTRACT

There is provided a system and method for a universal file packager for use with an interoperable key chest. There is provided a method for distributing media contents to distributors, comprising obtaining a first key, a second key and a content, encrypting the second key using the first key to generate an encrypted second key, encrypting the content using the second key to generate an encrypted content, generating a key information file including the encrypted second key, generating a universal file including the encrypted content and a first network address for a central key repository (CKR), providing the key information file for storage in the CKR, and providing the universal file to the distributors. The universal file can then be provided to users for digital e-commerce and transferred across different distributors with the CKR negotiating key access for granting new interoperable DRM licenses.

22 Claims, 8 Drawing Sheets

(56) References Cited

U.S. PATENT DOCUMENTS

2008/0216177 A1  9/2008  Yokosato
2009/0007240 A1  1/2009  Vantalon
2009/0044241 A1  2/2009  Joo
2009/0165080 A1  6/2009  Fahn
2009/0192942 A1  7/2009  Cottrille
2009/0290711 A1* 11/2009 Bloom et al. ................ 380/239

OTHER PUBLICATIONS

Suzuki, Hirotoshi et al. "*Modeling and Feature Analyses of a Structure of Electronic Copyright Management System (ECMS)*" Research Report of Society of Information Processing (99-EIP-4), Japan, Society of Information Processing, May 22, 1999, vol. 9, No. 46, pp. 9-16.
English Translation of Japanese Office Action dated Feb. 25, 2014 in Japanese Patent Application No. 2013-032536.

* cited by examiner

Fig. 4a
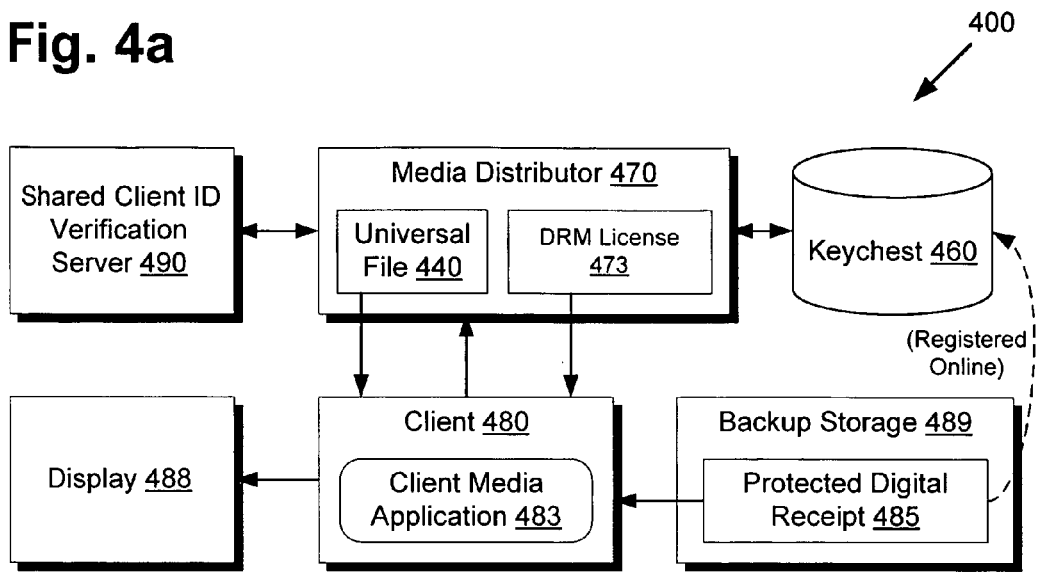
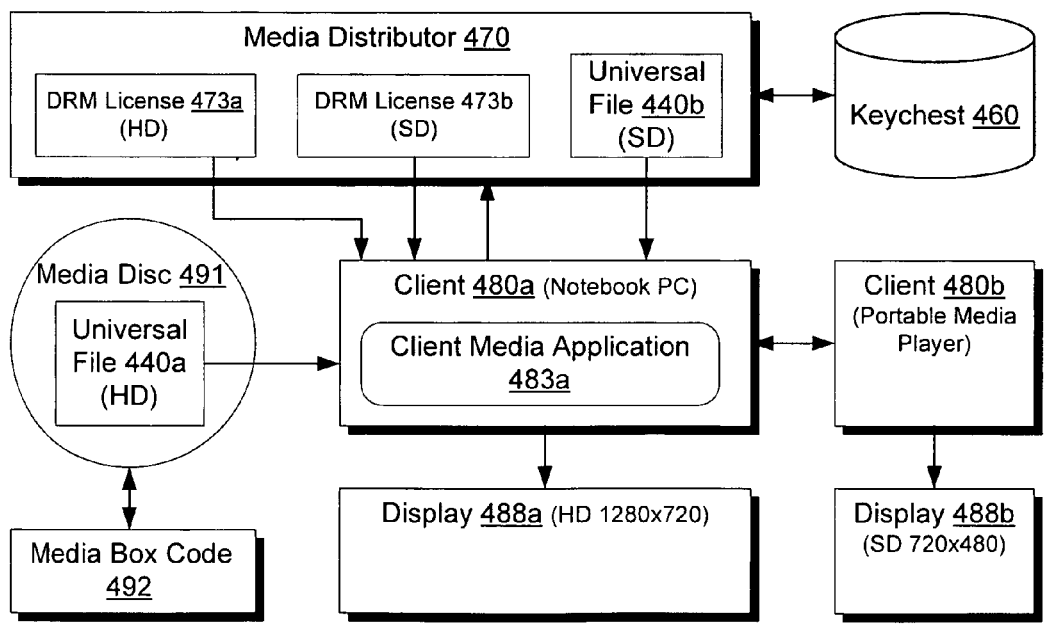
Fig. 4b

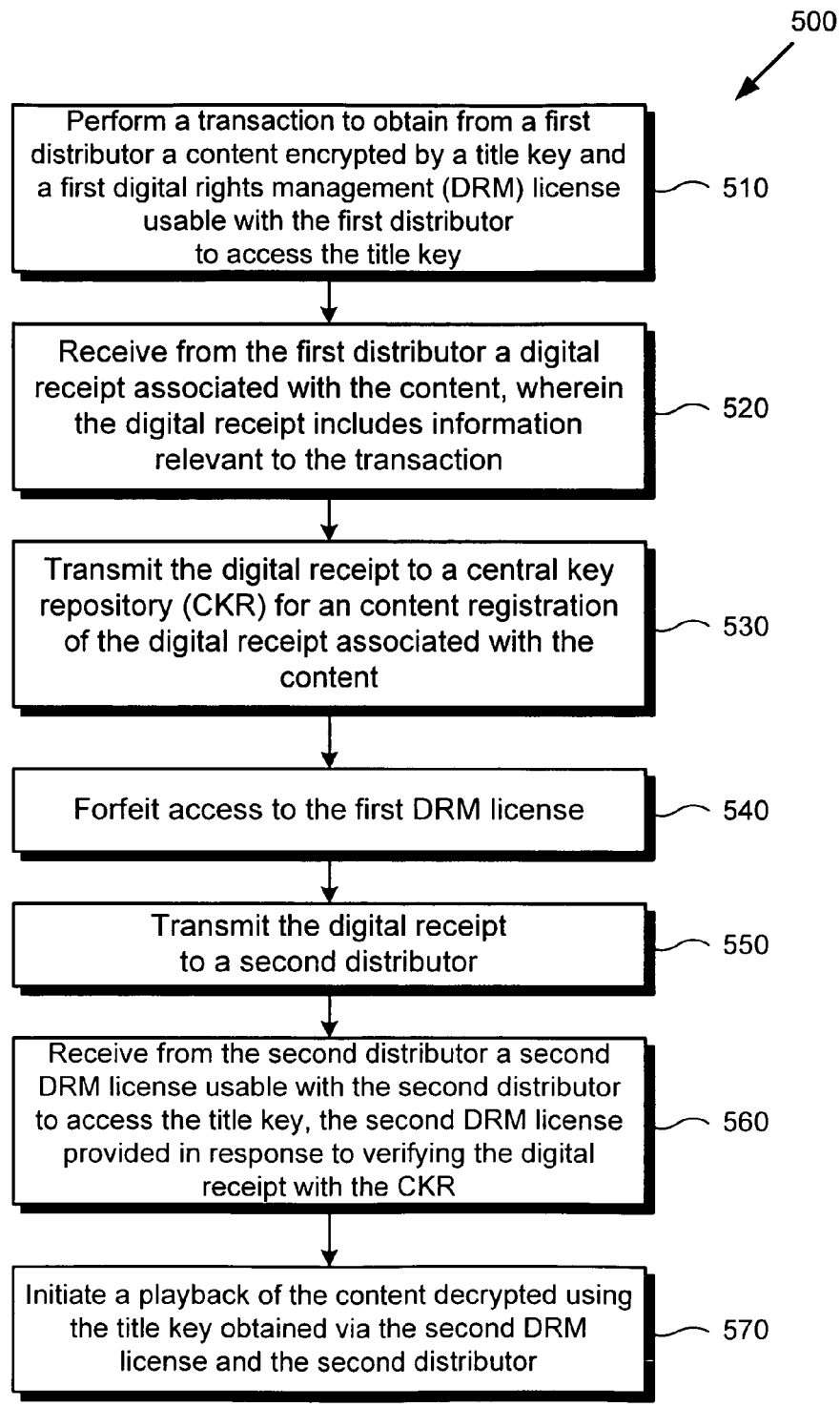

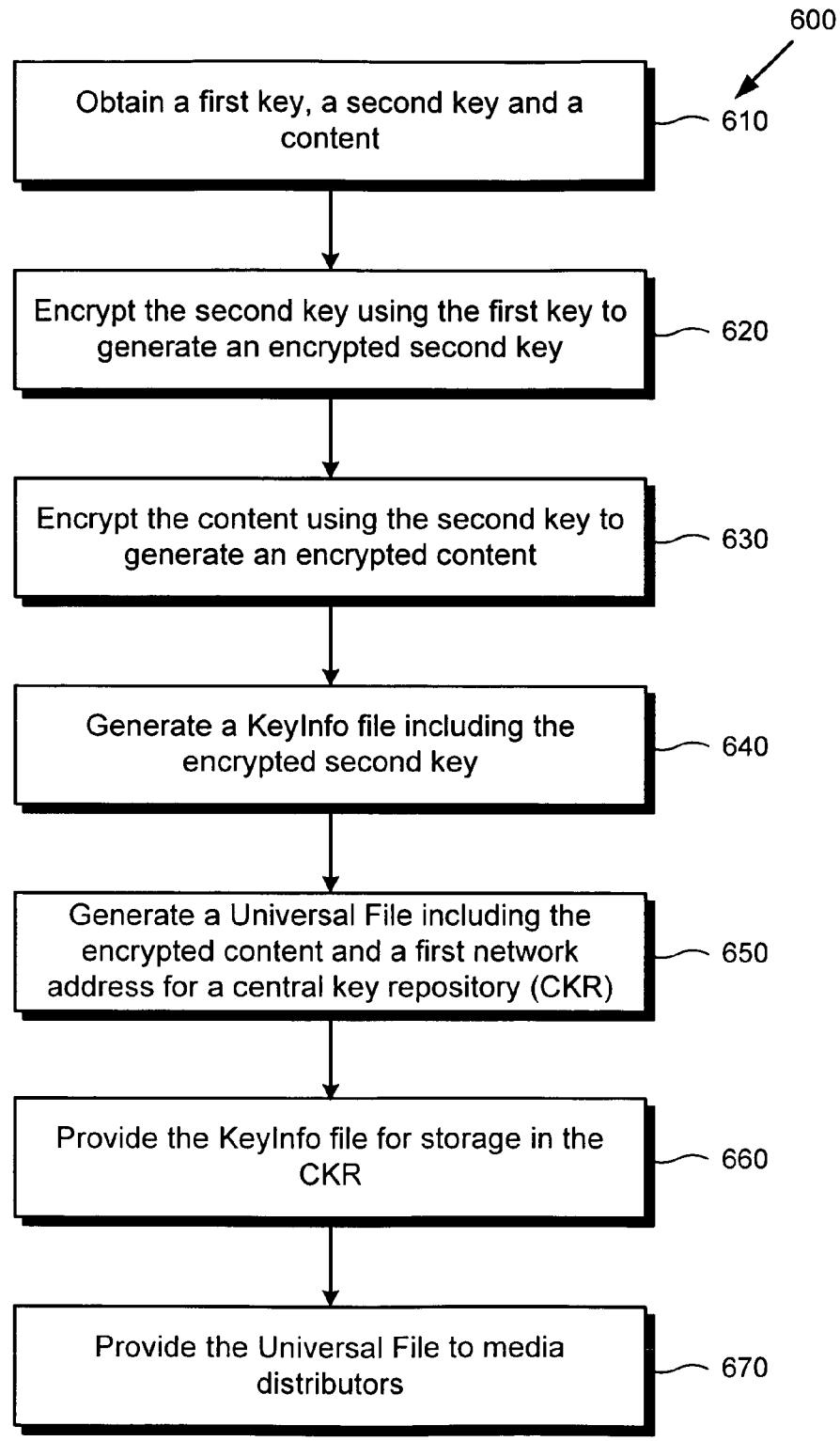

UNIVERSAL FILE PACKAGER FOR USE WITH AN INTEROPERABLE KEYCHEST

BACKGROUND OF THE INVENTION

1. Field of the Invention

The present invention relates generally to digital media. More particularly, the present invention relates to digital rights management for digital media.

2. Background Art

Although digital media distribution is growing in popularity and becoming a viable alternative to purchasing retail physical media for many consumers, there are still significant barriers present before consumers can wholly embrace digital media without reservations. Many of these reservations revolve around the limited interoperability between different playback devices or service providers, and the possibility that media files may become inoperable in the future due to new formats or protection schemes. For example, competing digital media distribution channels may use incompatible media formats and proprietary DRM systems, and the closing or termination of video offerings due to financial difficulties or company ownership changes may leave consumers with media files that cannot be consumed anymore.

Thus, there is a need for interoperable protected contents that can survive changes in the distribution market and provide continued service to consumers regardless of the original distribution channel used and the original media file format. In this manner, consumers can easily switch service providers, use protected media across a wide variety of playback devices, and remain confident that playback of protected content is ensured into the future. Similarly, content producers can remain confident of relying on digital distribution of protected media as a viable and sustainable business model. However, to ensure such interoperability in the most straightforward method by simply dictating a single DRM methodology, many existing DRM systems and distribution channels may need to radically modify established and proven operating procedures, a proposition that may find little enthusiasm in the marketplace. In addition, this would create a single security point of vulnerability.

Accordingly, there is a need to overcome the drawbacks and deficiencies in the art by providing a way for digital media to interoperate across different service providers and media devices in a manner that requires minimal disruptive changes to existing digital rights management paradigms, distribution models and consumption models, particularly with respect to key management and protected media file storage and distribution.

SUMMARY OF THE INVENTION

There are provided systems and methods for a universal file packager for use with an interoperable key chest, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 4a presents a system for playback of protected media using an interoperable keychest independent of an original issuing media distributor, according to one embodiment of the present invention;

FIG. 4b presents a system for redemption of secondary protected media using an interoperable keychest, according to one embodiment of the present invention;

FIG. 5 shows a flowchart describing the steps, according to one embodiment of the present invention, by which online registration of a digital receipt associated with a content can be used with a central key repository (CKR) to enable interoperable playback of the content independent of an initial distributor;

FIG. 6 shows a flowchart describing the steps, according to one embodiment of the present invention, by which media contents may be distributed to media distributors;

DETAILED DESCRIPTION OF THE INVENTION

The present application is directed to a system and method for a universal file packager for use with an interoperable keychest. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
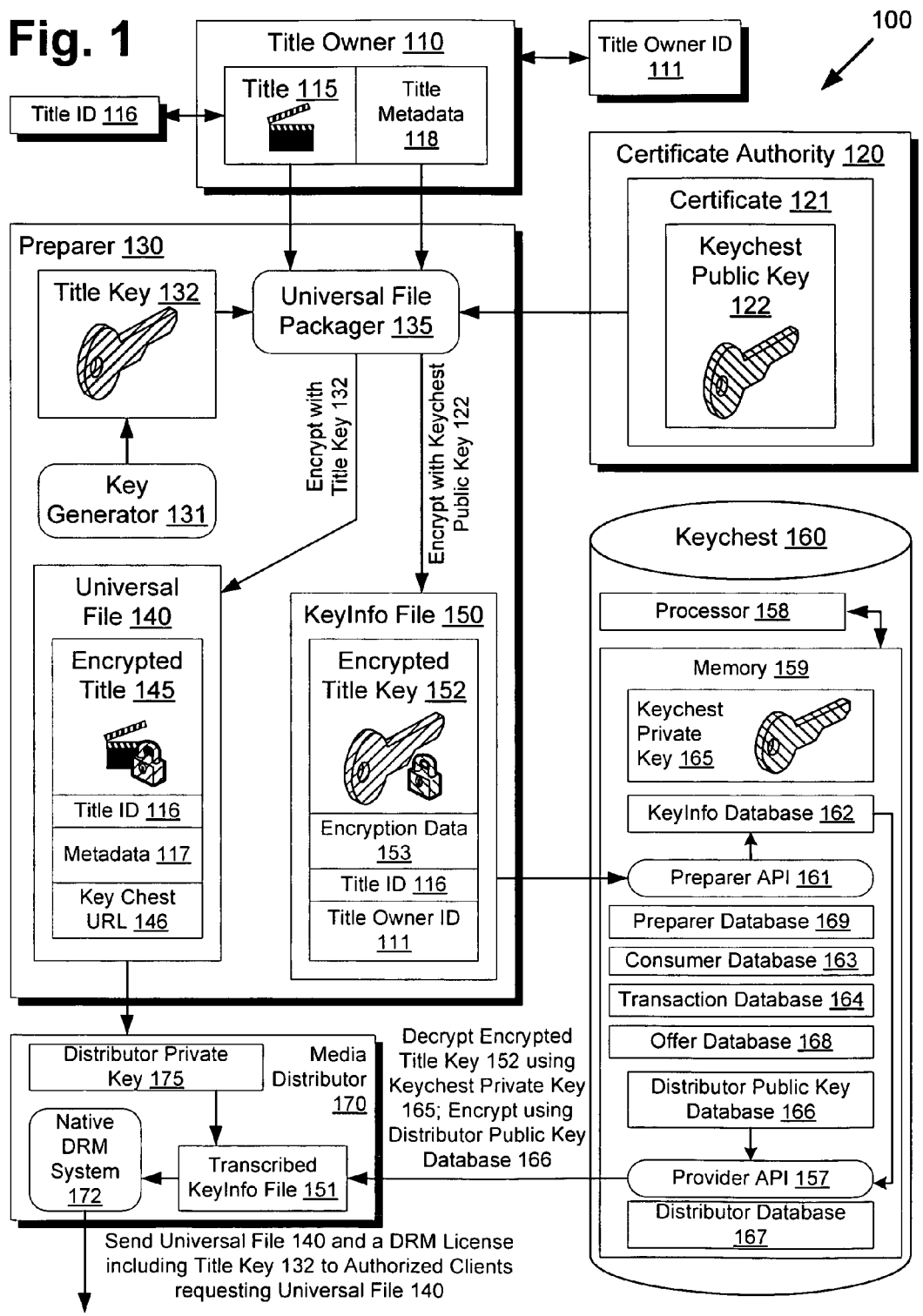
FIG. 1 presents a system generating files for use with an interoperable keychest, according to one embodiment of the present invention.

FIG. 1 presents a system generating files for use with an interoperable keychest, according to one embodiment of the present invention. Environment 100 of FIG. 1 includes title owner 110, title owner ID (identifier) 111, title ID 116, certificate authority 120, preparer 130, keychest 160, and media distributor 170. Title owner 110 includes title 115 and title metadata 118. Certificate authority 120 includes certificate 121. Certificate 121 includes keychest public key 122. Preparer 130 includes key generator 131, title key 132, universal file packager 135, universal file 140, and KeyInfo file 150. Universal file 140 includes title ID 116, metadata 117, encrypted title 145, and keychest URL (Uniform Resource Locator) 146. KeyInfo file 150 includes title owner ID 111, title ID 116, encryption data 153, and encrypted title key 152. Keychest 160 includes processor 158 and memory 159.

Memory 159 includes preparer API (Application Program Interface) 161, KeyInfo database 162, consumer database 163, transaction database 164, keychest private key 165, distributor public key database 166, distributor database 167, and provider API 157. Media distributor 170 includes transcribed KeyInfo file 151, distributor private key 175, and native DRM (digital rights management) system 172.

Title owner 110 may comprise the producer, broadcaster, copyright holder, author, or assignee of title 115, such as an individual artist or composer, a media group, a film production studio, an animation studio, a television studio, or a movie distributor. Title 115 may then comprise a creative media work or project, such as a musical composition or album, a radio program, a video clip, a full-length film or animation, an episode of a drama or television series, an interactive videogame, or any other type of audiovisual work or content. Title metadata 118 may then be provided to describe title 115 in more detail, such as providing human readable title names, specific media categories, content genres, media formats, ratings, and other information helpful for cataloging and identifying title 115. While title metadata 118 is shown as provided by title owner 110 in FIG. 1, alternative embodiments may instead use preparer 130 or another third party to generate title metadata 118.

Additionally, title owner 110 and title 115 are each uniquely identified by title owner ID 111 and title ID 116, respectively. These identifiers may also be included within title metadata 118. Although any suitable algorithm for selecting unique identifiers may be adopted, title ID 116 may be particularly suited to a combination of an International Standard Audiovisual Number (ISAN), if available, and a Universally Unique Identifier (UUID) based on a cryptographic function such as Secure Hash Algorithm 1 (SHA-1). In this manner, disparate title owners not in communication with each other can still generate title IDs with a strong assurance of uniqueness. Alternatively, a centralized body may dispense unique identifiers to requesting parties, guaranteeing uniqueness by maintaining a database of all identifiers.

Once the above identifiers, metadata, and title files are in order, title owner 110 may convey them to universal file packager 135 of preparer 130 for integration into distribution channels serving the general public. This conveyance to preparer 130 may be done by any suitable means of communication, preferably in a secure manner to mitigate the risk of third party leaks. For example, various protected Internet protocols might be utilized, such as secure FTP (File Transfer Protocol), secure sockets layer (SSL), secure shell (SSH), or another protocol. Alternatively, data may be written onto physical media, to be delivered by mail or in person to preparer 130.

Title owner 110 and preparer 130 are shown as separate entities in FIG. 1, as the process of preparing a title for encoding and distribution might be outsourced to a third party facility for efficiency or other reasons. However, alternative embodiments may have title owner 110 also assuming the functions of preparer 130, which may be more convenient for smaller media unit operations. In this case, title owner 110 and preparer 130 are owned by the same parent and their functions might be consolidated into a single server or computing cluster.

Key generator 131 provides encryption keys to universal file packager 135 to support protection of contents through encryption. Without applying some kind of protection to title 115, it becomes difficult to enforce license terms and prevent unauthorized copying since consumers have direct access to unprotected media files. Thus, as shown in FIG. 1, key generator 131 generates a symmetric encryption key, title key 132, to both encrypt and decrypt title 115. By limiting access to title key 132 to authorized media applications having the proper DRM licenses, consumers can still enjoy viewing or listening to title 115 without having direct access to title 115 in unprotected form.

Although longer key lengths and stronger encryption algorithms for title key 132 may provide greater security against circumvention techniques, decoding complexity may also pose an important counter consideration. This consideration may be particularly acute for mobile devices having limited battery life, memory, and processing resources. Thus, for encrypting title key 132, a balanced compromise such as the Advanced Encryption Standard (AES) may be chosen to provide reasonably strong security with fast decoding times.

In order to securely convey title key 132 from preparer 130 for access by keychest 160, an asymmetric cryptography key pair, generated by certificate authority 120, is used as shown in FIG. 1. The key pair could also be generated by keychest 160 and the certificate issued by certificate authority 120. Public and private key pairs may, for example, use 2048 bit RSA keys in accordance with Public-Key Cryptography Standards #1 (PKCS#1). The public key of the key pair is included in a digital certificate 121. By retrieving keychest public key 122 from certificate 121, universal file packager 135 can encrypt title key 132 using keychest public key 122, resulting in the encrypted title key 152, such that only keychest 160, the owner of corresponding keychest private key 165, may decrypt encrypted title key 152. Certificate authority 120 acts as the trusted third party in FIG. 1, vouching that keychest public key 122 provided within certificate 121 properly binds to the entity known as keychest 160.

Certificate authority 120 may for example comply with the X.509 Version 3 certificate standard. In order to verify the identity of certificate authority 120, preparer 130 may also have a preloaded set of certificates vouching for the identity of trusted third parties such as certificate authority 120. Mutual authentication may also be implemented so that certificate authority 120 only responds to authorized preparers, media distributors or service providers, and other involved parties. Although only a single certificate authority is shown in FIG. 1, alternative embodiments may use a hierarchical system of certificate authorities or an alternative trust system other than X.509 such as a peer moderated web of trust.

In this manner, keychest 160 acts as a centralized key repository (CKR) holding title keys within KeyInfo files in encrypted form. Through preparer API 161, content preparers such as preparer 130 can submit encrypted title keys in KeyInfo file containers such as KeyInfo file 150. These KeyInfo files, containing encrypted title keys such as encrypted title key 152, encryption data or metadata such as encryption data 153, and associated content information such as title owner ID 111 and title ID 116, may be deposited in a database such as KeyInfo database 162. For preparer 130 to access preparer API 161, standard web services may be exposed by keychest 160 using Simple Object Access Protocol (SOAP) and Hypertext Transfer Protocol Secure (HTTPS) using Transport Layer Security (TLS) with Diffie-Hellman in accordance with PKCS#3 for key exchange. This same manner of secure communication or variants using different parameters may also be used for other communication paths shown in FIG. 1 and the following figures. Additionally, security measures such as limiting incoming Internet Protocol (IP) address ranges or Media Access Control (MAC) address ranges to well known values may also be implemented to further protect against unauthorized access.

As previously discussed, encrypted title key 152 is encrypted using keychest public key 122. Since keychest 160 is the owner of the corresponding private key, keychest private key 165, it may freely decrypt and access all title keys submitted to KeyInfo database 162 in the above described fashion. Using processor 158 to interpret requests received via preparer API 161 and provider API 157 in memory 159, keychest 160 can provide robust key storage and distribution services for authorized preparers and media distributors, also referred to as service providers or content providers. In the other direction, through provider API 157, authorized distributors such as media distributor 170 can request these title keys in encrypted form using their own assymetrical key pair to securely generate DRM licenses for delivery to consumer media applications and devices. As such, the original KeyInfo files from KeyInfo database 162 are decrypted and encrypted, or transcribed, using an encryption key applicable for each particular media distributor to generate transcribed KeyInfo files such as transcribed KeyInfo file 151.

In FIG. 1, this KeyFile transcription is enabled by having keychest 160 gather the public keys of all media distributors within distributor public key database 166, with each media distributor such as media distributor 170 owning their own corresponding private key, such as distributor private key 175. Media distributors may generate their own key pairs using a standard public key infrastructure (PKI) approach. However, alternative embodiments may use alternative encryption arrangements, such as wherein keychest 160 generates public/private key pairs and provides the private keys to each media distributor using a secure communication channel. As before with keychest public key 122, certificate authority 120 or another trusted third party may be utilized to provide trusted certificates ensuring legitimate bindings between public keys and their associated referenced identities.

As shown in keychest 160, several additional databases are available including consumer database 163, transaction database 164, distributor database 167, offer database 168, and preparer database 169. These databases may be utilized to implement various business rules from the keychest side, thereby registering media transactions performed by consumers and the associated rights, registering consumer authentication data, and ensuring that only authorized providers and media distributors, pursuant to various business agreements, can interact with keychest. For example, after every successful online transaction, a record might be stored in transaction database 164, indicating the date and time of sale, the price paid, the type of purchase whether rental, permanent purchase, redemption, or subscription, whether a provided redemption code has been used multiple times, relevant identifiers such as a consumer, client, device ID, and other details. Thus, keychest 160 may be able to enforce rental time periods, redemption count limitations, and other business rules as necessary. Distributor database 167 may track which media distributors are privileged to access which KeyInfo files, as keychest 160 may support several different affiliated or non-affiliated media distributors with disparate content licensing agreements. Consumer database 163 may serve as a rights repository allowing consumers to access and unlock protected media files without being restricted to a particular media distributor, as discussed further in FIG. 2 below, and also include authentication information to allow consumers to authenticate across multiple distributors using a single or multiple authentication schemes, such as proprietary authentication scheme from unique distributors or a more open framework like OpenID. Additionally or alternatively, keychest 160 might include a device database, not shown in FIG. 1, which lists media devices, which could be associated to a particular consumer, allowing for models based on binding to a particular device rather than to particular consumers or allowing for models based on binding to both the device and the consumer. Generally speaking, the device database works similarly to consumer database 163 and may be associated to it. Offer database 168 may associate titles with specific usage rules to support multiple business models such as rental, subscription, and purchase, for example. Preparer database 169 may ensure that only authorized media preparers can upload KeyInfo files into keychest 160.

Switching focus from KeyInfo file 150 to universal file 140, universal file 140 is also generated by universal file packager 135 for distribution to media distributors and eventually to consumers. The name "universal file" describes the property that even if media distributors use different DRM systems, the same file is distributed to consumers and is interoperable across different media distributors with the help of the CKR, keychest 160. As shown in FIG. 1, title 115 is encrypted with title key 132 to create encrypted title 145, which is accompanied with identifying data including title ID 116, metadata 117, and keychest URL 146. Metadata 117 may contain, for example, components of title metadata 118. Keychest URL 146 acts as a pointer or network address to direct where to find the keychest storing the associated KeyInfo file 150 so that encrypted title 145 can be decoded using a title key stored in KeyInfo file 150. In the case of FIG. 1, keychest URL 146 would point to keychest 160. It should be noted that the keychest URL might simply point to a redirection server using URL redirection to flexibly redirect keychest communications. Additionally, the URL form is chosen to tie with web services accessible over the Internet using SOAP, but alternative network addressing protocols could also be used as well. The components of universal file 140 may be embedded in a standard container format such as a MPEG-4 Part 14 or MP4 container file. Additionally, if title 115 is provided in an uncompressed format, preparer 130 may apply video and audio compression before encrypting title 115, using for example MPEG-4 part 10 or H.264. After universal file 140 is generated, it may be provided to media distributor 170.

Once media distributor 170 receives universal file 140, it may immediately request the associated KeyInfo file from keychest URL 146, or may delay the request until a consumer or client actually requests universal file 140. In either case, media distributor 170 queries keychest 160, using for example SOAP over HTTPS as previously discussed, to request information contained in the relevant KeyInfo file associated with title ID 116. Keychest 160 may then search KeyInfo database 162 to discover KeyInfo file 150 stored there with the same title ID 116, apply all relevant business logic rules to determine whether permission to distribute the file should be granted, and provide transcribed KeyInfo file 151 if such a determination is positive. Transcribed KeyInfo file 151 may look similar to KeyInfo file 150, with the exception that encrypted title key 152 is encrypted with the public key of media distributor 170, rather than the public key of keychest 160, keychest public key 122. As previously discussed, the transcription step may be supported by keychest 160 collecting in advance the public keys of all media distributors into distributor public key database 166.

To avoid constantly retrieving newly transcribed KeyInfo files from keychests, media distributors might store a local cache of transcribed KeyInfo files to avoid unnecessarily burdening keychest resources. To keep the cached KeyInfo files updated, a request for changes occurring since previous KeyInfo accesses might be requested from keychests periodically or on demand. Alternatively, keychests might proactively send updates to media distributors.

Once media distributor 170 has both transcribed KeyInfo file 151 and universal file 140, it may use them in conjunction with distributor private key 175 and native DRM system 172 to service media files to clients in a protected manner with minor modification, if any, to any existing DRM systems infrastructure that may already be in place for media distributor 170. Media distributor 170 can use its own private key, distributor private key 175, to access title key 132 from transcribed KeyInfo file 151 and feed such title key 132 to native DRM system 172. The native DRM system 172 can then generate the appropriate DRM license containing the usage rules and title key 132 encrypted using its own security protocol. Once the consumer receives the universal file 140 and the native DRM license, it can consume the media contained in the universal file 140 as allowed by the usage rules.

In this manner, the barrier of entry for adopting the universal file format and the interoperable keychest is minimized for participating media distributors, encouraging wider distribution channel adoption and providing all the benefits of enhanced interoperability to consumers. By helping address interoperability and availability concerns regarding digitally distributed media and by providing a digital receipt within the control of the consumer as described below in FIG. 2, consumers may feel empowered rather than restricted by digital distribution, which may in turn translate to higher sales and greater consumer satisfaction.

Although title owner 110, title 115, certificate authority 120, preparer 130, keychest 160, and media distributor 170 only have single instances in FIG. 1, alternative embodiments may include several instances of each entity. For example, universal file 140 could encapsulate several different titles as part of a compilation, album, or as alternative tracks. Similarly, KeyInfo file 150 may store several associated title keys. Keychests can also be scaled to suit particular organizational needs. For example, a large studio having many movie units and subdivisions may decide to dedicate a distinct keychest for every studio division, or may prefer to have all divisions served by one large consolidated keychest. Alternatively, particularly for smaller studios, several different studios or companies might share a single keychest, or outsource keychest operation and maintenance to a third party entity. Another possibility is one large centralized keychest operated by a third party, with studios submitting KeyInfo files to the centralized keychest. As mentioned above, URL redirection might also be used for flexible keychest redirection, enabling server load balancing, fast migration, and other features. Keychests might also share information with other keychests if the proper agreements and security procedures are in place. In other words, keychests can be as centralized or decentralized as desired, but a centralized keychest having access to a large KeyInfo database may provide more efficient service to clients having accounts with multiple media distributors.

Figure 2:
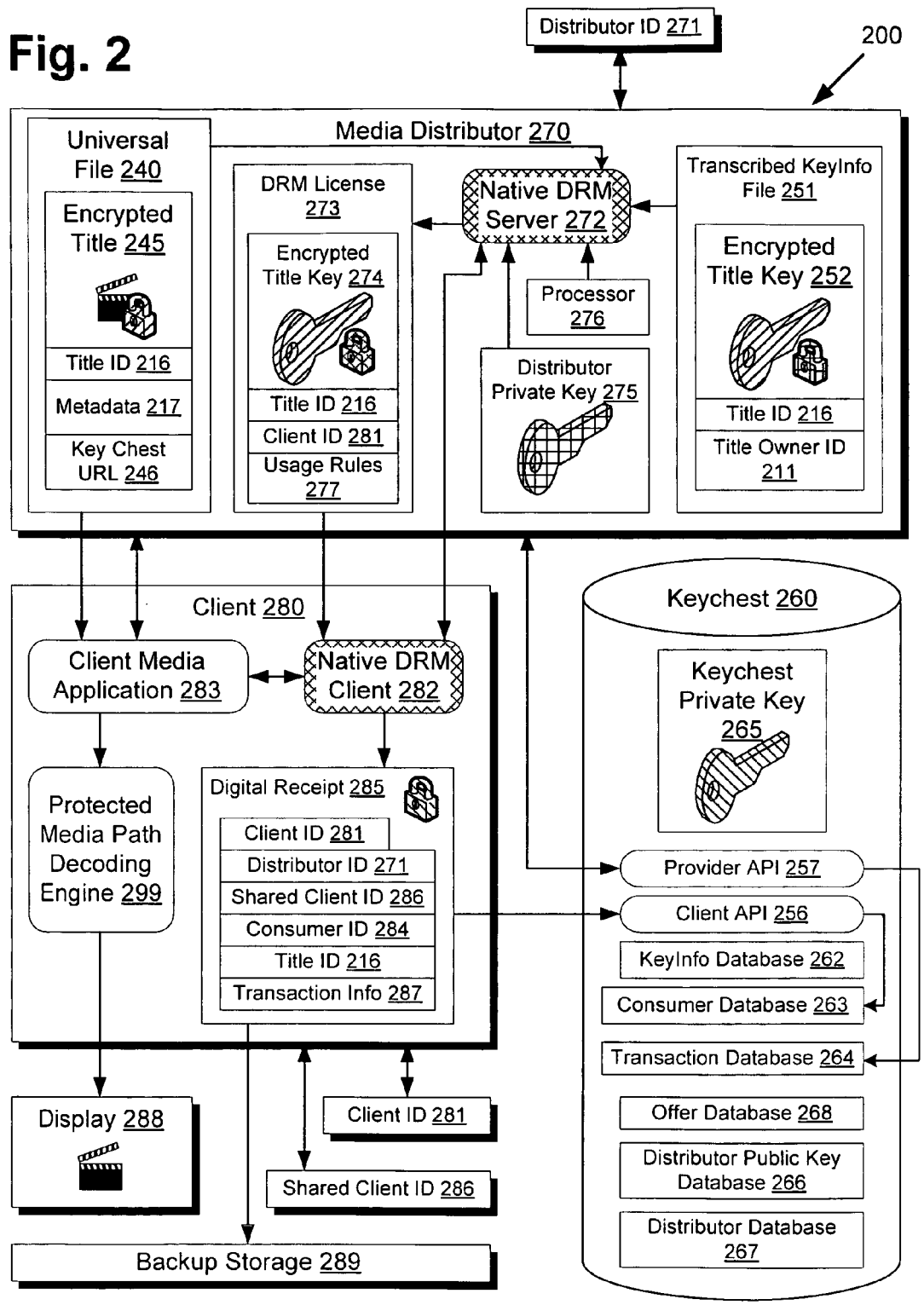
FIG. 2 presents a system providing a client with a digital receipt for use with an interoperable keychest, according to one embodiment of the present invention.

FIG. 2 presents a system providing a client with a digital receipt for use with an interoperable keychest, according to one embodiment of the present invention. Environment 200 of FIG. 2 includes keychest 260, media distributor 270, distributor ID 271, client 280, client ID 281, shared client ID 286, display 288, and backup storage 289. Keychest 260 includes KeyInfo database 262, consumer database 263, transaction database 264, keychest private key 265, distributor public key database 266, distributor database 267, offer database 268, client API 256, and provider API 257. Since in FIG. 2, there are no interactions with preparers, a corresponding preparer API 161 and preparer database 169 from FIG. 1 are omitted from FIG. 2 for simplicity, but they may still exist within keychest 260. Media distributor 270 includes universal file 240, transcribed KeyInfo file 251, native DRM server 272, DRM license 273, distributor private key 275, and processor 276. Universal file 240 includes title ID 216, metadata 217, encrypted title 245, and keychest URL 246. Transcribed KeyInfo file 251 includes title owner ID 211, title ID 216, and encrypted title key 252. DRM license 273 includes title ID 216, encrypted title key 274, client ID 281, and usage rules 277. Client 280 includes native DRM client 282, client media application 283, protected media path decoding engine 299, and digital receipt 285. Digital receipt 285 includes title ID 216, distributor ID 271, client ID 281, shared client ID 286, consumer ID 284, and transaction info 287. With regards to FIG. 2, it should be noted that keychest 260 corresponds to keychest 160 from FIG. 1 and that media distributor 270 corresponds to media distributor 170 from FIG. 1. Although keychest 260 of FIG. 2 does not depict a processor or memory as in keychest 160 of FIG. 1, it may be assumed they exist to support the operation of the APIs and other logical operations of keychest 260.

FIG. 2 shifts the focus from the title owners and preparers in FIG. 1 to the media distributors and clients in FIG. 2. More specifically, FIG. 2 illustrates how a consumer or client can actually access a media file for eventual playback on display 288 using the universal file, KeyInfo file, and CKR or keychest concepts introduced in FIG. 1. Additionally, FIG. 2 introduces the concept of the digital receipt, shown as digital receipt 285, which can act as a proof of purchase or proof of transaction for reactivating protected media contents even if the client loses the originally retrieved protected media files or if the client switches media distributors, for example.

The contents of universal file 240 and transcribed KeyInfo file 251 have already been described in some detail through the corresponding universal file 140 and transcribed KeyInfo file 151 from FIG. 1. Transcribed KeyInfo file 251 may have been provided to media distributor 270 by an entity having a distribution agreement with media distributor 270, such as an entity similar to title owner 110 of FIG. 1, along with keychest 260 for the transcription step. Processor 276 of media distributor 270 may be used with distributor private key 275 to decrypt encrypted title key 252 for use with native DRM server 272. Native DRM server 272 executing on processor 276 may then use all the inputs indicated in FIG. 2 to generate DRM license 273 for distribution to authorized clients requesting universal file 240. Encrypted title key 274 may be protected using a protection system provided by native DRM server 272, effectively changing the encryption partner of media distributor 270 from keychest 260 to client 280. This step might be viewed like an additional transcription step similar to keychest 260 providing KeyInfo files transcribed for specific media distributors, but with media distributor 270 instead providing DRM licenses with transcribed title keys for specific clients.

Examining DRM license 273, encrypted title key 274 is included, corresponding to a title key usable to decrypt universal file 240. DRM license 273 also includes identifying information, including the client the DRM license applies to, or client ID 281, and the associated media title or universal file, or title ID 216. Additional information could also be embedded with DRM license 273, such as distributor ID 271, shared client ID 286, consumer ID 284, usage rules 277, and transaction info 284 as indicated in FIG. 2.

Moving to client 280, client 280 might comprise a personal computer, a media player, a set-top box, a videogame console, a mobile phone, a portable media player, or any other device for interfacing with media distributor 270. Client 280 may also include client media application 283 for browsing, purchasing, playback, and other transactions with digital media provided by media distributor 270. After the consumer decides to purchase, rent, or otherwise obtain universal file 240 through a digital transaction for playback on client 280, media distributor 270 may process the transaction by interfacing with a financial institution to charge an agreed amount or internally subtracting an agreed amount of prepaid points or other currency, generate DRM license 273 as described above, and provide both universal file 240 and DRM license 273 to client 280 via native DRM server 272. Additionally, a record of the digital transaction may be deposited in transaction database 264 via provider API 257 of keychest 260.

After client 280 receives both universal file 240 and DRM license 273, client 280 can use DRM license 273 in conjunction with native DRM client 282 to decrypt encrypted title 245 within universal file 240 for consumption by playback using protected media path decoding engine 299 outputting to display 288, which may also include speakers for audio content. Therefore, the consumer may view the requested media on display 288.

While having universal file 240 and DRM license 273 allows client 280 to playback encrypted title 245 while native DRM client 282 is able to interface with DRM server 272, there may be situations where one or more of the above elements are missing to client 280, where the user needs to use a different client entirely, or where the user needs to use a different media distributor. To provide for these contingencies, media distributor 270 may also provide client 280 with a secure digital receipt 285. If the consumer needs to address the situations listed above, digital receipt 285 can be retrieved and presented to an alternative media distributor or to keychest 260 as a proof of purchase to obtain the universal file again, to obtain a new DRM license, or even both, as the situation may demand.

As shown in FIG. 2, client 280 proactively safeguards digital receipt 285 by copying to backup storage 289, which might comprise a Universal Serial Bus (USB) storage device, and registering with the relevant CKR or keychest 260 via client API 256 for depositing the digital receipt into consumer database 263. For example, a web interface may be provided to allow direct uploading of digital receipts to keychest 260 via client API 256, which may expose HTTPS protected SOAP web services similar to provider API 257. A third party may provide and maintain backup storage 289, for example by providing an online backup service or web accessible e-mail server. In particular, if digital receipts are provided to users via registered e-mail addresses, user e-mail accounts may effectively substitute as a backup repository for digital receipts.

Alternatively, after a user consummates a digital transaction, client media application 283 might prompt the user to register the digital receipt online with keychest 260 automatically. Keychest 260 may then provide a return value to client 280, indicating either success or failure of the digital receipt registration process.

Digital receipt 285 contains several fields related to the identity of the user leading to the creation of the digital receipt. Client ID 281 identifies a consumer or device in relation to a particular DRM system implemented by native DRM client 282 and native DRM server 272. Consumer ID 284 and distributor ID 271 indicates the particular consumer in relation to a specific media distributor, whereas shared client ID 286, an optional component, may globally identify the user in a general sense. Shared client ID 286 may be tied to an external user authentication system, such as OpenID, which is usable to authenticate across several media distributors, rather than just a single one. Since not all users may possess such a shared client ID, it may be omitted for such users, or a substitute identifier might be created and provided for the user. However, if shared client ID 286 is provided, then keychest 260 may be able to identify all receipts within consumer database 263 attributable to the consumer regardless of the media distributor, which may prove to be helpful for users having large media collections across several different media distributors.

Digital receipt 285 also contains several fields related to the transaction creating the digital receipt. Title ID 216 indicates the specific universal file referenced by the digital receipt, whereas transaction info 287 may contain specific information regarding the transaction such as a transaction date, a transaction type or an offer ID, and metadata regarding the content referenced by title ID 216. The transaction date may include a specific date and time the transaction occurred, whereas the transaction type may, for example, indicate whether the transaction was a full purchase, a rental, part of a subscription plan, or comprised another type of transaction. The metadata might include information similar to metadata 117 from FIG. 1, such as titles, genre classifications, ratings, and other data. Digital receipt 285 may also optionally contain information regarding keychest 260, such as a keychest URL or alternatively information about a server used to register the digital receipt 285 in the form of a URL or similar reference data. While the majority of the data stored in digital receipt 285 may be protected with encryption, the title metadata portion of transaction info 287 might be presented in an unencrypted plain text form, allowing digital receipts to be easily identified by users. As shown in FIG. 2, portions of digital receipt 285 are encrypted with the public key of keychest 260, where keychest 260 can use keychest private key 265 to decrypt the encrypted portions, but other protection methods usable by keychest 260 may also be utilized. In addition, portions of digital receipt 285 may also be digitally signed by the issuing media distributor 270 so that keychest 260 can confirm that digital receipt 285 was duly issued by an authorized media distributor.

Once digital receipt 285 is safely stored in backup storage 289 and consumer database 263 of keychest 260, the user of client 280 is protected from the loss of universal file 240, the loss of DRM license 273, and the loss or changing of client 280 and/or media distributor 270. The user merely needs to retrieve digital receipt 285 from backup storage 289 and resubmit it to either keychest 260, media distributor 270, or another media distributor having an established relationship with keychest 260. Once digital receipt 285 is directly submitted or forwarded to keychest 260, keychest 260 can validate the receipt using, as appropriate, keychest private key 265 to decrypt the encrypted portion of the digital receipt 285 and/or the public key of the media distributor 270 to validate the signature described above, and process any relevant business rules to approve or deny a query or request. If the query or request is approved, a media distributor may retrieve the corresponding KeyInfo file to authorize resending universal file 240 and/or to generate new DRM licenses including the title key for the user.

While from the user's point of view, it may be ideal for all media distributors to provide any demanded KeyInfo file for any submitted digital receipt, limited distribution agreements between different media distributors and title owners may restrict the range of KeyInfo files deliverable by any single media distributor. Specifically, distributor database 267 may dictate access privileges to specific KeyInfo files according to the identity of a querying media distributor. In the case of media distributor 270, this would correspond to distributor ID 271, which might be provided as part of the HTTPS or TLS handshaking procedure prior to establishing secure communications with keychest 260 via provider API 257.

Moreover, while the user might prefer that all media distributors offer the downloading of universal file 240 or the generation of a new DRM license for free, media distributors must also consider expenses such as server and network maintenance, customer service, and distribution contracts. Thus, while some media distributors might offer free reactivation through digital receipts to encourage usage of their particular online services, other media distributors might charge a fee for redeeming digital receipts to cover the costs of bandwidth, server maintenance, customer support, and acquiring and renewing distribution rights and content licenses. These considerations might be encapsulated within business rules implemented by keychest 260 or by individual media distributors, flexibly independent of the core key storing and distributing functions of the CKR, keychest 260.

Figure 3:
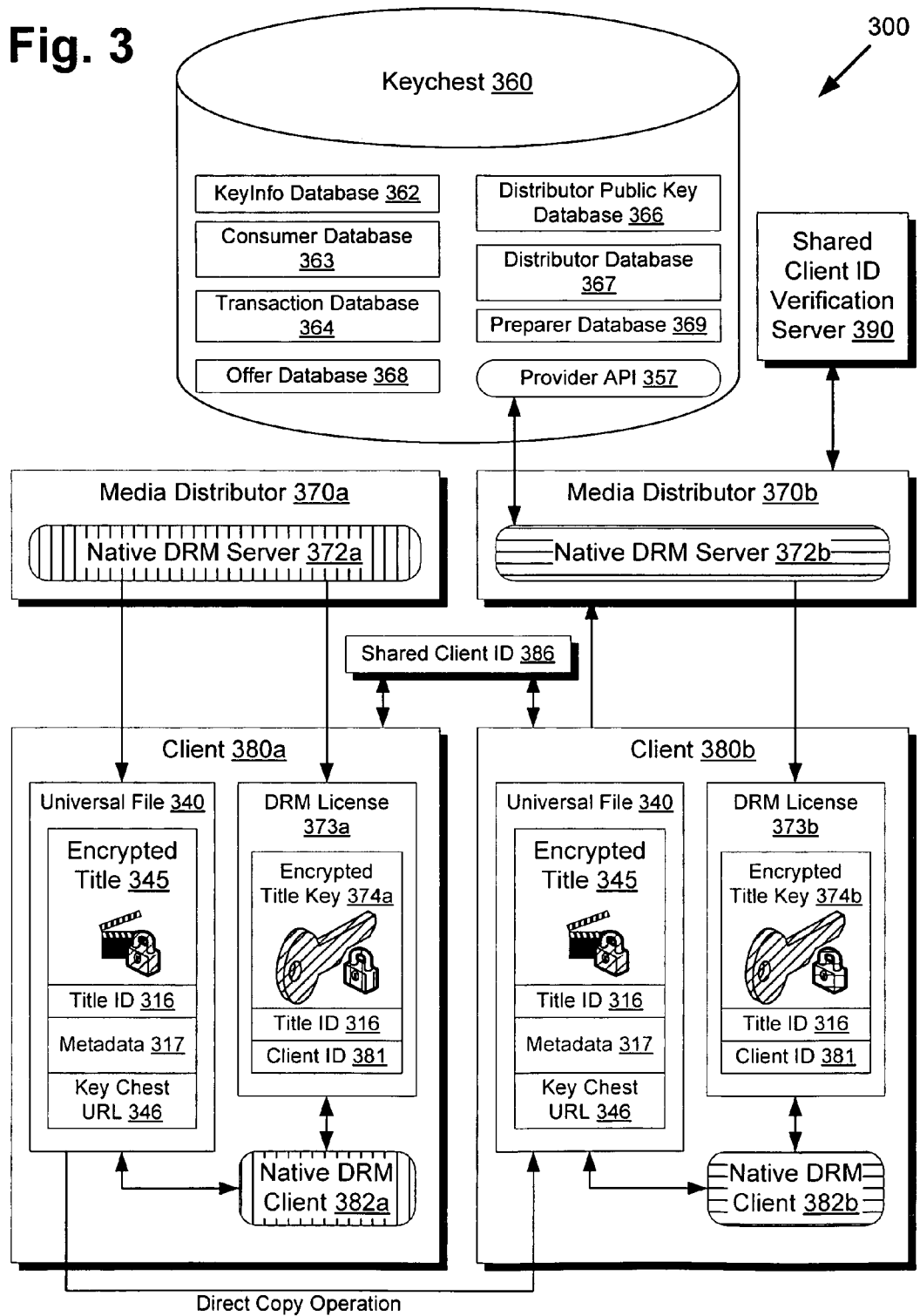
FIG. 3 presents a system for obtaining protected digital rights management (DRM) licenses through an interoperable keychest for interoperability between different DRM systems, according to one embodiment of the present invention.

FIG. 3 presents a system for obtaining protected digital rights management (DRM) licenses through an interoperable keychest for interoperability between different DRM systems, according to one embodiment of the present invention. Environment 300 of FIG. 3 includes keychest 360, media distributors 370a-370b, clients 380a-380b, shared client ID 386, and shared client ID verification server 390. Keychest 360 includes KeyInfo database 362, consumer database 363, transaction database 364, distributor public key database 366, distributor database 367, offer database 368, preparer database 369, and provider API 357. Media distributor 370a includes native DRM server 372a. Media distributor 370b includes native DRM server 372b. Client 380a includes universal file 340, DRM license 373a, and native DRM client 382a. Universal file 340 includes title ID 316, metadata 317, encrypted title 345, and keychest URL 346. DRM license 373a includes title ID 316, encrypted title key 374a, and client ID 381. Client 380b includes universal file 340, DRM license 373b, and native DRM client 382b. DRM license 373b includes title ID 316, encrypted title key 374b, and client ID 381. With regards to FIG. 3, it should be noted that keychest 360 corresponds to keychest 260 from FIG. 2, that media distributors 370a-370b correspond to media distributor 270, and that clients 380a-380b correspond to client 380.

While the concept of using a digital receipt for interoperability between different media distributors has been explained in some detail in FIG. 2 above, FIG. 3 presents an alternative method of interoperability between different media distributors where a universal file is merely copied between different clients and used to obtain a new DRM license applicable to the new client, even if the different media distributors use different DRM systems or schemas.

For example, assume that the user of client 380a has already purchased universal file 340, which also results in the acquisition of an associated DRM license 373a. Additionally, a record of the purchase is recorded in transaction database 364, including the identity of the purchaser, shared client ID 386. As previously discussed, shared client ID 386 might use an identification scheme such as an OpenID. By using a DRM system or schema supported by native DRM client 382a and native DRM server 372a, the user of client 380a can now easily consume and playback and enjoy encrypted title 345 on client 380a. However, the user of client 380a may have several different clients or devices for media consumption, with some clients more suitable for certain situations than others. For example, client 380a might represent a personal computer of the user, whereas client 380b might represent a videogame console of the user. The user may wish to view universal file 340 on client 380b rather than client 380a if, for example, the videogame console happens to be connected to a high-end home theater system in the living room, whereas the personal computer happens to be relegated to the den with tinny computer speakers and a small LCD screen. Alternatively, client 380b might represent a portable media device of the user, where the user wants to view universal file 340 while flying on a business trip.

Traditionally, transferring media files between different devices utilizing different DRM systems has been difficult or impossible, as proprietary closed system DRM formats tend to introduce incompatibilities preventing full interoperability. In addition to DRM interoperability challenges, media container formats and compression algorithms may result in even unprotected content not be playable on different platforms.

However, the introduction of the universal file concept as shown in FIG. 3 may help to largely address this concern among digital media consumers. As shown in FIG. 3, after the purchase of universal file 340 from client 380a, it is copied directly as-is to client 380b, as evidenced by the identical contents between the two instances of universal file 340 within client 380a and client 380b. Alternatively, universal file 340 might be first copied to an intermediary storage location, such as a USB storage device, before being copied to client 380b. Since DRM license 373a only works with the DRM system supported by native DRM client 382a and native DRM server 372a, DRM license 373a is of no use to client 380b. However, with the assistance of keychest 360, client 380b can obtain DRM license 373b from media distributor 370b, even though client 380b and media distributor 370b utilize a different DRM system supported by native DRM server 372b and DRM client 382b.

After receiving universal file 340, client 380b may query media distributor 370b for DRM license 373b. Client 380b may also provide identifying credentials associated with shared client ID 386, such as a username and password. Media distributor 370b may then verify the identity of the user by relaying the identifying credentials to shared client ID verification server 390.

Once the identity of client 380b is confirmed, media distributor 370b may query keychest 360 via provider API 357 to confirm whether the user identified by shared client ID 386 has rights associated with universal file 340. Thus, keychest 360 may examine transaction database 364 to confirm the existence of a previous transaction with media distributor 370a involving the purchase of universal file 340 by the same user identified using shared client ID 386. If transaction database 364 instead reported no matching results associated with shared client ID 386 and universal file 340 or that the transaction type was merely a rental rather than a purchase, keychest 360 may stop processing and return that permission was denied. Distributor database 367 may also be consulted to determine whether media distributor 370b has an agreement in place for the distribution of the relevant KeyInfo file associated with universal file 340 from KeyInfo database 362. Additionally, as previously discussed, various business rules might be enforced by keychest 360. For example, to prevent universal file distribution abuse, a global limit of 5 different clients might be supported for any single purchase tied to an identifiable user, with users requiring more than 5 concurrently active DRM licenses addressed by customer service on a case-by-case basis. Similarly, a global limit of 5 different identities might be supported to identify the same consumer.

Assuming keychest 360 confirms a qualifying transaction within transaction database 364 and any and all other business rules are met to satisfaction, keychest 360 may retrieve the associated KeyInfo file from KeyInfo database 362, providing media distributor 370b a transcribed KeyInfo file using a public key of media distributor 370b, as previously described.

Media distributor 370b may then use the transcribed KeyInfo file to generate DRM license 373b using native DRM server 372b and provide DRM license 373b to native DRM client 382b in client 380b. Thus, the user of client 380b is able to consume universal file 340 by retrieving DRM license 373b, which comprises a much smaller download size than having to download universal file 340 again, providing almost instant playback and allowing the user to enjoy universal file 340 on the high-end home theater system or on the portable media device.

Alternatively, instead of routing a digital receipt through a media distributor as an intermediary, client 380b may directly retransmit a digital receipt to keychest 360 if keychest 360 provides a direct client interface for requesting registered media. Individual keychests may provide this functionality at their own discretion. As previously discussed, the digital receipt acts as a proof of the transaction, and therefore can be retransmitted back to keychest 360 to obtain access to the original media or licenses granted by the original transaction. If keychest 360 does support such direct requests from client 380b, and if keychest 360 determines that client 380b is privileged to access the requested registered media as detailed above, then keychest 360 can direct client 380b to an appropriate media distributor capable of serving the requested registered media.

For example, keychest 360 may first determine a list of privileged media distributors using distributor database 367, finding all third party media distributors having distribution rights or distribution privileges for the requested registered media, for example universal file 340. Then, the user of client 380b might be prompted to select from the list of providers to be redirected to a particular third party media distributor. After the user of client 380b is redirected to the particular third party media distributor, for example media distributor 370b, then keychest 360 may forward to media distributor 370b a verification that the user of client 380b is authorized to retrieve the requested universal file 340 and/or any associated DRM licenses. As before, this verification may involve verifying a submitted digital receipt against registered digital receipts in consumer database 363 and applying any applicable business rules. After that, the process continues as normal, as if the user submitted the digital receipt to the media distributor instead of the CKR. Thus, media distributor 370b may therefore provide DRM license 373b to client 380b for consuming universal file 340.

Additionally, this process of sharing universal files and obtaining different DRM licenses could be used to offer friends and associates recommended media files without the need for them to re-download associated universal files. For example, the user of client 380a may provide the user of client 380b a copy of universal file 340, perhaps through a USB storage device. However, since client 380b does not know the private login details of the user of client 380a, client 380b will be unable to provide login credentials for shared client ID 386, allowing media distributor 370b to ascertain that the user of client 380b is not the same as the user of client 380a, the original purchaser of the copied universal file 340. Instead, media distributor 370b might display an offer for executing a new transaction to obtain a DRM license for universal file 340, unlocking it for instant playback. Additionally, although two separate media distributors are shown in FIG. 3, this process could also apply to clients using the same media distributor.

As shown in FIG. 3, each media distributor can provide the exact same universal file for a particular media title, even if different DRM systems or schemas are used. With keychest 360 functioning as a central rights clearinghouse and shared client ID verification server 390 verifying the identity of unique users across providers, media distributors can provide interoperable solutions with minimal additional effort and reengineering of existing DRM systems. This allows users to easily transport universal files between different devices and media distributors, with only a quick retrieval of a new DRM license required to playback copied universal files.

FIG. 4a presents a system for playback of protected media using an interoperable keychest independent of an original issuing media distributor, according to one embodiment of the present invention. Environment 400 of FIG. 4a includes keychest 460, media distributor 470, client 480, display 488, backup storage 489, and shared client ID verification server 490. Media distributor 470 includes universal file 440 and DRM license 473. Client 480 includes client media application 483. Backup storage 489 includes digital receipt 485. With regards to FIG. 4a, it should be noted that keychest 460 corresponds to keychest 260 from FIG. 2, that media distributor 470 corresponds to media distributor 270, that client 480 corresponds to client 280, and that backup storage 489 corresponds to backup storage 489.

As previously discussed, there may be situations where a user may forfeit, voluntarily or involuntarily, access to purchased universal files and associated DRM licenses. Voluntary forfeiting might include changing client devices or media distributors. Involuntary forfeiting might include catastrophic hardware failures such as a failed hard disk drive, or user error such as accidentally deleting a file. Since each digital transaction is accompanied with a mandatory digital receipt under user control, as shown in FIG. 2, the user has full discretion to plan for such contingencies independently of the original media distributor. For example, if the user diligently registers a digital receipt online with an associated keychest and kept a safe backup, the user merely needs to resubmit the digital receipt to regain access to the associated universal file and DRM license.

For example, assume that the user of client 480 suffered through a catastrophic hard disk drive failure. The user replaces the hard disk drive of client 480 and reinstalls client media application 483 for interfacing with media distributor 470 again. Since the hard drive stored the user's media library of universal files and DRM licenses, the user of client 480 seeks to regain access to his old media library. Thankfully, the user kept copies of the digital receipts within backup storage 489, which might comprise a USB storage device or an online e-mail provider, as previously discussed. Additionally, as indicated in FIG. 4a, the user registered digital receipt 485 online with keychest 460, so that digital receipt 485 may be stored within a user authentication database of keychest 460.

Thus, the user of client 480 merely provides digital receipt 485 retrieved from backup storage 489 to media distributor 470, along with user credentials for verifying with media distributor 470, or alternatively a shared user credential for verifying with shared client ID verification server 490. Media distributor 470, after consulting with keychest 460, may then provide universal file 440 and DRM license 473 back to client 480. Additionally, media distributor 470 might also provide a batch transfer of any other universal files and DRM licenses having properly registered digital receipts within keychest 460 matching the user credentials provided by client 480 and duly verified by media distributor 470 or shared client ID verification server 490. This batch transfer may save the user considerable time and effort if several digital receipts are to be submitted, which may be the case after a catastrophic hardware failure. Several business rules may come into play in this model as to address possible abuse, ensure proper functioning of the system, or offer additional services to the consumer.

Additionally, this same mechanism can provide users a kind of insurance against the failure or reorganization of their favorite media distributors. If, for example, the media distributor that client 480 usually patronizes suddenly goes out of business, as long as the user of client 480 kept a backup of digital receipts and registered the digital receipts with keychest 460, the user can easily migrate to another media distributor such as media distributor 470 of FIG. 4a. In this manner, many long standing user concerns regarding the permanence of DRM protected digital media may be effectively resolved.

FIG. 4b presents a system for redemption of secondary protected media using an interoperable keychest, according to one embodiment of the present invention. Environment 400 of FIG. 4b includes keychest 460, media distributor 470, clients 480a-480b, displays 488a-488b, media disc 491, and media box code 492. Media distributor 470 includes universal file 440b and DRM licenses 473a-473b. Client 480a includes client media application 483a. Media disc 491 includes universal file 440a. With regards to FIG. 4b, it should be noted that keychest 460 corresponds to keychest 260 from FIG. 2, that media distributor 470 corresponds to media distributor 270, that clients 480a-480b correspond to client 280, and that displays 488a-488b correspond to display 288.

Although the discussion of universal files thus far has been generally limited to online digital distribution, universal files may also have applications with physical retail media as well. For example, media disc 491 might comprise a Blu-ray disc purchased through retail channels. Besides storing the standard Blu-ray movie data, corresponding universal files might also be included for use on a personal computer or for portable media devices. Media box code 492 might then comprise a unique numeric or alphanumeric sequence printed within the inside liner or under a hidden scratch panel, usable to redeem universal file 440a for playback by retrieving an applicable DRM license. In this sense, media box code 492 may act as an anonymous user identifier, as keychest 460 can limit the number of redemptions for any single media box code using business rules.

Thus, the user of client 480a, a notebook PC, might insert media disc 491 into a Blu-ray drive, where the user is prompted whether he wishes to redeem universal file 440a. If the user answers yes, he may be prompted to enter media box code 492, which is sent along with any identifying metadata contained in universal file 440a to media distributor 470. Media distributor 470 may then consult with keychest 460 to determine whether media box code 492 is valid and/or has reached a maximum redemption count. For example, a business rule at keychest 460 might enforce that each valid media box code may only provide for a maximum of three (3) redemptions, again to prevent the potential abuse of indiscriminate universal file sharing. If keychest 460 answers positively, then media distributor 470 might provide DRM license 473a so that the user of client 480a can view the movie at full resolution on display 488a of the notebook PC.

Additionally, a compelling sales point for media disc 491 might include the ability to copy the movie from media disc 491 to various portable devices. Thus, client 480a might additionally request for a standard definition (SD) 720×480 version of the movie for playback on portable devices with standard definition displays. Using the same media box code 492 and the same metadata from universal file 440a, media distributor 470 might again query keychest 460 for a special standard definition version KeyFile for portable devices, which is duly returned and used to generate universal file 440b and DRM license 473b, which can then be transferred to client 480b for playback on display 488b. Moreover, the redemption of box codes can be associated with a client or consumer ID and recorded within relevant databases in keychest 460, as previously done with online transactions. Alternatively, various universal files already formatted for popular media devices might be embedded on media disc 491 such that only a corresponding DRM license needs to be retrieved, reducing download time.

FIG. 5 shows a flowchart describing the steps, according to one embodiment of the present invention, by which online registration of a digital receipt associated with a content can be used with a central key repository (CKR) to enable interoperable playback of the content independent of an initial distributor. Certain details and features have been left out of flowchart 500 that are apparent to a person of ordinary skill in the art. For example, a step may comprise one or more substeps or may involve specialized equipment or materials, as known in the art. While steps 510 through 570 indicated in flowchart 500 are sufficient to describe one embodiment of the present invention, other embodiments of the invention may utilize steps different from those shown in flowchart 500.

Referring to step 510 of flowchart 500 in FIG. 5 and environment 200 of FIG. 2, step 510 of flowchart 500 comprises client 280 performing a transaction to obtain from media distributor 270 universal file 240 including encrypted title 245 encrypted by a title key corresponding to an unencrypted version of encrypted title key 274, or title key 132 from FIG. 1, and DRM license 273 usable with media distributor 270 to access the unencrypted version of encrypted title key 274. This procedure has already been discussed in some detail, but briefly, client 280 uses client media application 283 to browse a digital storefront and select universal file 240 to commence a transaction. In response, media distributor 270 provides universal file 240 and the associated DRM license 273 to client 280 via interactions with keychest 260, native DRM server 272, and native DRM client 282.

Referring to step 520 of flowchart 500 in FIG. 5 and environment 200 of FIG. 2, step 520 of flowchart 500 comprises client 280 receiving a digital receipt 285 associated with encrypted title 245, wherein digital receipt 285 includes information relevant to the transaction of step 510. As shown in FIG. 2, this information includes client ID 281, distributor ID 271, shared client ID 286, consumer ID 284, title ID 216, and transaction info 287, but alternative embodiments may use other data arrangements. Additionally, as shown in FIG. 2, portions of digital receipt 285 are provided encrypted by the public key of keychest 260.

Referring to step 530 of flowchart 500 in FIG. 5 and environment 200 of FIG. 2, step 530 of flowchart 500 comprises client 280 transmitting digital receipt 285 received from step 520 to keychest 260 for an online registration of digital receipt 285 within consumer database 263. As shown in FIG. 2, client 280 transfers digital receipt 285 using client API 256 of keychest 260, which may expose web services accessible by SOAP over HTTPS.

Referring to step 540 of flowchart 500 in FIG. 5 and environment 400 of FIG. 4a, step 540 of flowchart 500 comprises client 480 forfeiting access to DRM license 473 corresponding to DRM license 273 retrieved from step 510. As previously discussed, this might be a voluntary forfeiture by changing media distributors or clients, or involuntarily by, for example, hardware failures resulting in data loss. In either case, client 480 will no longer have direct access to DRM license 473 after step 540. However, client 480 may still retain direct access to universal file 440 corresponding to universal file 240 retrieved from step 510, contrary to the access state shown in FIG. 4a.

Referring to step 550 of flowchart 500 in FIG. 5 and environment 400 of FIG. 4a, step 550 of flowchart 500 comprises client 480 transmitting digital receipt 485 to media distributor 470, where digital receipt 485 corresponds to digital receipt 285 retrieved from step 520, and wherein media distributor 470 is a different entity from media distributor 270 accessed during steps 510-520. After step 550, media distributor 470 may scrutinize digital receipt 485 for validity by querying keychest 460 for prior evidence of online registration of the same digital receipt 485. Keychest 460 may also apply various business rules before providing a relevant KeyInfo file for generating a new DRM license.

Referring to step 560 of flowchart 500 in FIG. 5 and environment 400 of FIG. 4a, step 560 of flowchart 500 comprises client 480 receiving from media distributor 470 DRM license 473 usable with media distributor 470 to access a title key for decoding universal file 440, where the title key is the same as the title key used in step 510 for encrypted title 245. As previously discussed, after step 550, keychest 460 may also verify the identity of client 480, the authorization of media distributor 470, and any applicable business rules before providing the relevant KeyInfo file to allow step 560 to proceed.

Referring to step 570 of flowchart 500 in FIG. 5 and environment 400 of FIG. 4a, step 570 of flowchart 500 comprises client media application 483 of client 480 initiating a playback of universal file 440 on display 488 decrypted using the title key obtained by using DRM license 473 received from step 560 with media distributor 470. Since at the end of step 560, client 480 has access to both universal file 440 and DRM license 473, client 480 only needs to use the native DRM solution implemented by client media application 483 and media distributor 470 to access the title key embedded in DRM license 473 for decoding the encrypted title within universal file 440, which may then be consumed or output to display 488 for viewing by a user of client 480.

FIG. 6 shows a flowchart describing the steps, according to one embodiment of the present invention, by which media contents may be distributed to media distributors. Certain details and features have been left out of flowchart 600 that are apparent to a person of ordinary skill in the art. For example, a step may comprise one or more substeps or may involve specialized equipment or materials, as known in the art. While steps 610 through 670 indicated in flowchart 600 are sufficient to describe one embodiment of the present invention, other embodiments of the invention may utilize steps different from those shown in flowchart 600.

Referring to step 610 of flowchart 600 in FIG. 6 and environment 100 of FIG. 1, step 610 of flowchart 600 comprises universal file packager 135 of preparer 130 obtaining a first key, keychest public key 122, a second key, title key 132, and title 115. As shown in FIG. 1, keychest public key 122 is retrieved from a trusted third party, certificate authority 120, where certificate 121 is used to validate the binding between keychest public key 122 and keychest 160. However, alternative approaches with or without PKI may also be utilized. Preparer 130 may itself generate title key 132, using key generator 131. Title 115 is retrieved from title owner 110, which may be securely retrieved by digital or physical means. Title owner 110, as previously noted, may also be owned by the same entity as preparer 130.

Referring to step 620 of flowchart 600 in FIG. 6 and environment 100 of FIG. 1, step 620 of flowchart 600 comprises universal file packager 135 of preparer 130 encrypting title key 132 using keychest public key 122, both obtained from step 610, to generate encrypted title key 152. Since encrypted title key 152 can only be decrypted using keychest private key 165, only keychest 160 can access title key 132 from encrypted title key 152, as long as keychest 160 protects the privacy of keychest private key 165. As previously discussed, 2048 bit RSA keys in accordance with Public-Key Cryptography Standards #1 (PKCS#1) may be utilized for the asymmetric key encryption of step 620.

Referring to step 630 of flowchart 600 in FIG. 6 and environment 100 of FIG. 1, step 630 of flowchart 600 comprises universal file packager 135 of preparer 130 encrypting title 115 using title key 132, both obtained from step 610, to generate encrypted title 145. As previously discussed, a balanced compromise such as the Advanced Encryption Standard (AES) may used for the symmetric key encryption of step 630 to provide reasonably strong security with fast decoding times.

Referring to step 640 of flowchart 600 in FIG. 6 and environment 100 of FIG. 1, step 640 of flowchart 600 comprises universal file packager 135 of preparer 130 generating KeyInfo file 150 including encrypted title key 152 generated from step 620. As shown in FIG. 1, KeyInfo file 150 may also include various metadata and identifying information, such as title owner ID 111 and title ID 116, to aid in indexing and retrieving KeyInfo file 150 within KeyInfo database 162.

Referring to step 650 of flowchart 600 in FIG. 6 and environment 100 of FIG. 1, step 650 of flowchart 600 comprises universal file packager 135 of preparer 130 generating universal file 140 including encrypted title 145 generated from step 630 and keychest URL 146 for a central key repository (CKR), keychest 160. Keychest URL 146 represents a network address directing to keychest 160, and as previously discussed, a redirection server might also be used as an intermediary. Although FIG. 1 uses a URL as the network address to interface with web based SOAP over HTTPS, alternative embodiments might use other protocols to reach a network address in a secure manner. As shown in universal file 140, additional metadata and identifying information, such as title ID 116 and metadata 117, may also be included within universal file 140 to aid in the identification and cataloging of universal file 140.

Referring to step 660 of flowchart 600 in FIG. 6 and environment 100 of FIG. 1, step 660 of flowchart 600 comprises universal file packager 135 of preparer 130 providing KeyInfo file 150 for storage in KeyInfo database 162 of keychest 160. As shown in FIG. 1, this may be by using SOAP web services exposed over HTTPS by preparer API 161 of keychest 160. After keychest 160 authenticates preparer 130 as an authorized preparer and accepts KeyInfo file 150, it may be filed within KeyInfo database 162 for future retrieval by media distributors, the KeyInfo file prepared in a transcribed form by using a public key from distributor public key database 166 corresponding to a retrieving media distributor. In this case, each media distributor generates its own private/public key pairs and distributes public keys to keychest 160, but as previously discussed, keychest 160 could also generate private/public key pairs and distribute public keys to media distributors.

Referring to step 670 of flowchart, 600 in FIG. 6 and environment 100 of FIG. 1, step 670 of flowchart 600 comprises universal file packager 135 of preparer 130 providing universal file 140 to media distributor 170. Before step 670, suitable distribution arrangements between the parties should exist. More specifically, media distributor 170 should have an agreement to distribute title 115 from title owner 110, and distributor database 167 of keychest 160 should grant permission for media distributor 170 to access the corresponding KeyInfo file 150 from keychest 160. Although only a single media distributor is shown in FIG. 1, in alternative embodiments, title owner 110 may have agreements with several different media distributors, sending a universal file generated by a preparer to each of the different media distributors. As with title owner 110 providing title 115 to preparer 130, universal file 140 can be provided to media distributor 170 in any suitable secure method of communication, physically or digitally. Once universal file 140 is distributed to authorized media distributors such as media distributor 170, universal file 140 may be served to requesting clients or users through digital storefronts or other presentation methods.

Figure 7:
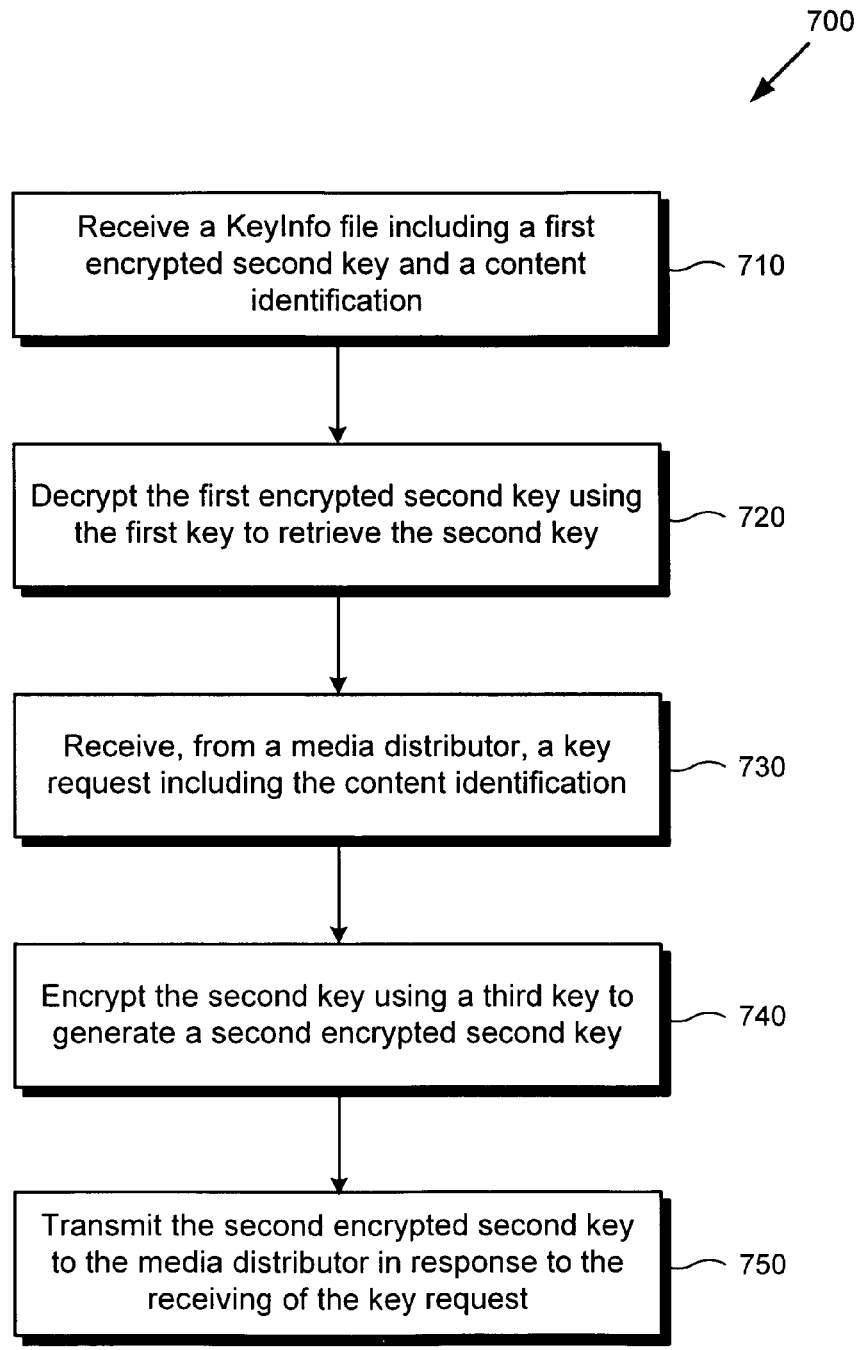
FIG. 7 shows a flowchart describing the steps, according to one embodiment of the present invention, by which a central key repository (CKR) can provide content access authorizations to media distributors.

FIG. 7 shows a flowchart describing the steps, according to one embodiment of the present invention, by which a central key repository (CKR) can provide content access authorizations to media distributors. Certain details and features have been left out of flowchart 700 that are apparent to a person of ordinary skill in the art. For example, a step may comprise one or more substeps or may involve specialized equipment or materials, as known in the art. While steps 710 through 750 indicated in flowchart 700 are sufficient to describe one embodiment of the present invention, other embodiments of the invention may utilize steps different from those shown in flowchart 700.

Referring to step 710 of flowchart 700 in FIG. 7 and environment 100 of FIG. 1, step 710 of flowchart 700 comprises keychest 160 receiving KeyInfo file 150 including encrypted title key 152, title ID 116, and title owner ID 111. As shown in FIG. 1, step 710 may be accomplished by exposing SOAP web services by HTTPS through preparer API 161 for use by preparer 130. Once keychest 160 receives KeyInfo file 150, it may catalogue it within KeyInfo database 162 for future retrieval by media distributors.

Referring to step 720 of flowchart 700 in FIG. 7 and environment 100 of FIG. 1, step 720 of flowchart 700 comprises keychest 160 decrypting encrypted title key 152 within KeyInfo file 150 received from step 710 using keychest private key 165 to retrieve title key 132. Since encrypted title key 152 was encrypted using keychest public key 122, keychest 160 only needs to use keychest private key 165, which it already has within memory 159, for decryption.

Referring to step 730 of flowchart 700 in FIG. 7 and environment 100 of FIG. 1, step 730 of flowchart 700 comprises keychest 160 receiving, from media distributor 170, a key request including title ID 116. For example, media distributor 170 may receive a request from a client to serve universal file 140. However, to enable playback of universal file 140, KeyInfo file 150 is also needed for decrypting. Since universal file 140 includes title ID 116, media distributor 170 can request a KeyInfo file matching title ID 116 from keychest 160 to fulfill the request from the client.

Referring to step 740 of flowchart 700 in FIG. 7, environment 100 of FIG. 1, and environment 200 of FIG. 2, step 740 of flowchart 700 comprises keychest 160 encrypting title key 132 decrypted from step 720 using a provider public key stored in distributor public key database 166 to generate encrypted title key 252 of transcribed KeyInfo file 251, wherein the provider public key corresponds to a public portion of a private/public asymmetric key pair including distributor private key 175. This provider public key may have been provided to keychest 160 in advance through a trusted third party such as certificate authority 120. Step 740 "transcribes" KeyInfo file 150 to transcribed KeyInfo file 151, corresponding to transcribed KeyInfo file 251 in FIG. 2. The term "transcribe" is used here in the sense that title key 132 transitions from being encrypted by keychest public key 122 as encrypted title key 152 to being encrypted by the provider public key as encrypted title key 252, so that only the associated media distributor 270 having distributor private key 275 can access the original title key 132 from transcribed KeyInfo file 251.

Referring to step 750 of flowchart 700 in FIG. 7 and environment 100 of FIG. 1, step 750 of flowchart 700 comprises keychest 160 transmitting encrypted title key 252 generated from step 740 corresponding to an encrypted title key contained within transcribed KeyInfo file 151 to media distributor 170 in response to step 730, the receiving of the key request. After step 750, media distributor 170 can use distributor private key 175 to access the original title key 132 for integrating within native DRM system 172 to enable access and playback of universal file 140.

Figure 8:
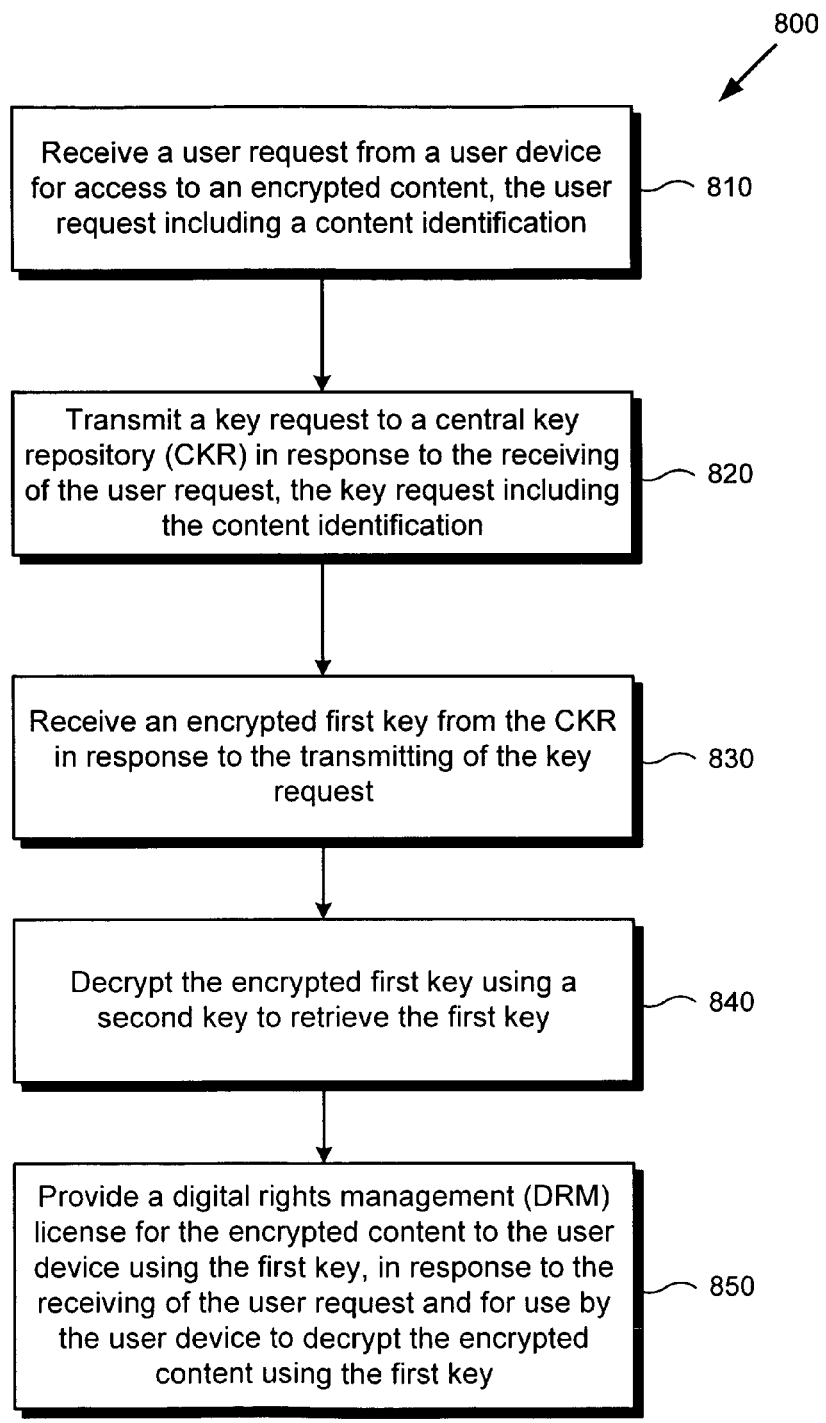
FIG. 8 shows a flowchart describing the steps, according to one embodiment of the present invention, by which a media distributor can obtain access to content access authorizations from a central key repository (CKR).

FIG. 8 shows a flowchart describing the steps, according to one embodiment of the present invention, by which a media distributor can obtain access to content access authorizations from a central key repository (CKR). Certain details and features have been left out of flowchart 800 that are apparent to a person of ordinary skill in the art. For example, a step may comprise one or more substeps or may involve specialized equipment or materials, as known in the art. While steps 810 through 850 indicated in flowchart 800 are sufficient to describe one embodiment of the present invention, other embodiments of the invention may utilize steps different from those shown in flowchart 800.

Referring to step 810 of flowchart 800 in FIG. 8 and environment 200 of FIG. 2, step 810 of flowchart 800 comprises media distributor 270 receiving a user request from client 280 for access to encrypted title 245 within universal file 240, the request including title ID 216. For example, client media application 283 may communicate with media distributor 270 to present an e-commerce storefront to the user of client 280. The user of client 280 may browse the e-commerce storefront and commence an agreement to purchase a license for viewing digital media identified by title ID 216, or encrypted title 245 within universal file 240. This agreement may then be sent as a user request to be transmitted to media distributor 270.

Referring to step 820 of flowchart 800 in FIG. 8 and environment 200 of FIG. 2, step 820 of flowchart 800 comprises media distributor 270 transmitting a key request to keychest 260 in response to step 810, the key request including title ID 216. By using provider API 257, media distributor 270 can send a key request to keychest 260 for a KeyInfo file corresponding to title ID 216. As with client API 256, provider API 257 may be exposed to the outside by web services via SOAP over HTTPS.

Referring to step 830 of flowchart 800 in FIG. 8 and environment 200 of FIG. 2, step 830 of flowchart 800 comprises media distributor 270 receiving transcribed KeyInfo file 251 including encrypted title key 252 in response to step 820. Transcribed KeyInfo file 251 may be received using the same secure connection established in step 820. Since encrypted title key 252 within transcribed KeyInfo file 251 is encrypted using a public key of media distributor 270, distributor private key 275 may be readily used to decrypt encrypted title key 252.

Referring to step 840 of flowchart 800 in FIG. 8 and environment 200 of FIG. 2, step 840 of flowchart 800 comprises media distributor 270 decrypting encrypted title key 252 of transcribed KeyInfo file 251 received from step 830 to retrieve a title key corresponding to title key 132 from FIG. 1. This title key can eventually be used to decrypt encrypted title 245 associated with title ID 216 within universal file 240.

Referring to step 850 of flowchart 800 in FIG. 8 and environment 200 of FIG. 2, step 850 of flowchart 800 comprises media distributor 270 providing DRM license 273 for encrypted title 245 of universal file 240 to client 280, DRM license 273 using the title key from step 840 as encrypted title key 274 protected by native DRM server 272. Step 850 is initiated in response to step 810 and for use by client 280 to decrypt encrypted title 245 using the title key from step 840 retrievable from DRM license 273 using native DRM client 282. After client 280 receives DRM license 273, it can use native DRM client 282 to remove the protection from encrypted title key 274, gaining access to the title key from step 840 to decrypt encrypted title 245 within universal file 240. After decrypting, client 280 may, for example, direct the decrypted contents over protected media path decoding engine 299 for playback on display 288, so that the user of client 280 can enjoy the content requested from step 810.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method of distributing media contents, the method comprising:
   obtaining a first key, a second key and a content;
   obtaining content information relating to the content;
   encrypting the second key using the first key to generate an encrypted second key;
   encrypting the content using the second key to generate an encrypted content;
   generating a key information file including the encrypted second key and the content information;
   generating a universal file including the encrypted content, the content information and a first network address for a central key repository (CKR);
   providing the universal file to one or more distributors from a source other than the CKR; and
   providing the key information file for storage in the CKR for distribution of the second key by the CKR upon one or more requests sent to the first network address by the one or more distributors.

2. The method of claim 1, wherein at least two of the one or more distributors receiving the universal file utilize a different digital rights management (DRM) scheme for distributing the content to consumers.

3. The method of claim 1, wherein the obtaining of the first key includes receiving the first key from a certificate authority trusted by the CKR.

4. The method of claim 1, wherein the obtaining of the second key includes generating the second key.

5. The method of claim 1, wherein the generating of the universal file includes encoding the content prior to encryption of the content.

6. The method of claim 1, wherein the generating of the universal file includes formatting the encrypted content, a first network address and content information relating to the content using the MPEG-4 container format.

7. The method of claim 1, wherein the content information includes a Universally Unique Identifier (UUID), an International Standard Audiovisual Number (ISAN) and a content owner identification.

8. The method of claim 1, wherein the content information includes a Universally Unique Identifier (UUID) and an International Standard Audiovisual Number (ISAN).

9. The method of claim 1, wherein providing the key information file for storage in the CKR further uses the CKR to transcribe the key information file such that the one or more distributors can use a third key related to the first key to decrypt the encrypted second key and retrieve the second key.

10. The method of claim 9, wherein the first key is a public key of the distributor, and wherein the third key is a private key of the distributor.

11. The method of claim 9, wherein the first key is a symmetric key, and wherein the third key is a symmetric key accessible by the distributor.

12. A universal file packager for distribution of media contents, the universal file packager comprising:
   a processor configured to:
      obtain a first key, a second key and a content;
      obtain content information relating to the content;
      encrypt the second key using the first key to generate an encrypted second key;
      encrypt the content using the second key to generate an encrypted content;
      generate a key information file including the encrypted second key and the content information;
      generate a universal file including the encrypted content, the content information and a first network address for a central key repository (CKR);
      provide the universal file to one or more distributors from a source other than the CKR; and
      provide the key information file for storage in the CKR for distribution of the second key by the CKR upon one or more requests sent to the first network address by the one or more distributors.

13. The universal file packager of claim 12, wherein at least two of the one or more distributors receiving the universal file utilize a different digital rights management (DRM) scheme than the other for retrieving the content from the universal file.

14. The universal file packager of claim 12, wherein the processor obtains the first key by receiving the first key from a certificate authority trusted by the CKR.

15. The universal file packager of claim 12, wherein the processor obtains the second key by generating the second key.

16. The universal file packager of claim 12, wherein the processor is configured to encode the content prior to generating the universal file.

17. The universal file packager of claim 12, wherein the processor is configured to generate the universal file by formatting the encrypted content, a first network address and content information relating to the content using the MPEG-4 container format.

18. The universal file packager of claim 12, wherein the content information includes a Universally Unique Identifier (UUID), an International Standard Audiovisual Number (ISAN) and a content owner identification.

19. The universal file packager of claim 12, wherein the content information includes a Universally Unique Identifier (UUID) and an International Standard Audiovisual Number (ISAN).

20. The universal file packager of claim 12, wherein the processor is configured to provide the key information file for storage in the CKR such that the CKR transcribes the key information file so that the one or more distributors can use a third key related to the first key to decrypt the encrypted second key and retrieve the second key.

21. The universal file packager of claim 20, wherein the first key is a public key of the distributor, and wherein the third key is a private key of the distributor.

22. The universal file packager of claim 20, wherein the first key is a symmetric key, and wherein the third key is a symmetric key accessible by the distributor.

* * * * *